US011312850B2

(12) United States Patent
Takekawa et al.

(10) Patent No.: US 11,312,850 B2
(45) Date of Patent: Apr. 26, 2022

(54) GASKET MATERIAL

(71) Applicant: NOK CORPORATION, Tokyo (JP)

(72) Inventors: Daiki Takekawa, Kanagawa (JP);
Masahiro Yokoo, Fukushima (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 16/766,317

(22) PCT Filed: Nov. 22, 2018

(86) PCT No.: PCT/JP2018/043254
§ 371 (c)(1),
(2) Date: May 22, 2020

(87) PCT Pub. No.: WO2019/103113
PCT Pub. Date: May 31, 2019

(65) Prior Publication Data
US 2020/0362153 A1 Nov. 19, 2020

(30) Foreign Application Priority Data

Nov. 24, 2017 (JP) .............................. JP2017-226108

(51) Int. Cl.
C08L 27/12 (2006.01)
C09K 3/10 (2006.01)
F16J 15/08 (2006.01)

(52) U.S. Cl.
CPC ............ *C08L 27/12* (2013.01); *C09K 3/1009* (2013.01); *F16J 15/0818* (2013.01);
(Continued)

(58) Field of Classification Search
None
See application file for complete search history.

(56) References Cited

U.S. PATENT DOCUMENTS

2003/0088013 A1   5/2003   Kudo et al.
2006/0217491 A1*  9/2006   Higashira ............... C08F 14/18
                                                   525/326.3
(Continued)

FOREIGN PATENT DOCUMENTS

EP    3228663 A1 * 10/2017 ............. B29C 33/00
JP    2003-334885 A   11/2003
(Continued)

OTHER PUBLICATIONS

ISR issued in WIPO Patent Application No. PCT/JP2018/043254, dated Feb. 19, 2019, English translation.
(Continued)

Primary Examiner — Nicole M. Buie-Hatcher
(74) Attorney, Agent, or Firm — Greenblum & Bernstein, P.L.C.

(57) ABSTRACT

A gasket material comprising a crosslinked fluororubber layer having a micro-hardness of 5 to 25 formed on a metal plate using a fluororubber composition comprising 30 to 70 parts by weight of carbon black having a CTAB specific surface area of 3 to 34 $m^2/g$, and 5 to 15 parts by weight of hydrated amorphous silicon dioxide having a BET specific surface area of 35 to 220 $m^2/g$, based on 100 parts by weight of fluororubber, wherein the total amount of carbon black and hydrated amorphous silicon dioxide is 80 parts by weight or less.

3 Claims, 1 Drawing Sheet

(52) U.S. Cl.
CPC .. *C08L 2312/00* (2013.01); *C09K 2200/0208* (2013.01); *C09K 2200/0247* (2013.01); *C09K 2200/0637* (2013.01)

(56) References Cited

U.S. PATENT DOCUMENTS

| | | | |
|---|---|---|---|
| 2010/0069558 A1* | 3/2010 | Stanga | C08L 27/12 524/495 |
| 2011/0143124 A1 | 6/2011 | Yokota et al. | |
| 2013/0150503 A1* | 6/2013 | Tanaka | C08K 5/136 524/93 |
| 2014/0031461 A1 | 1/2014 | Yamanaka et al. | |
| 2014/0363679 A1* | 12/2014 | Arisawa | B32B 15/18 428/422 |
| 2015/0353720 A1 | 12/2015 | Yamanaka et al. | |
| 2017/0037811 A1 | 2/2017 | Koga et al. | |

FOREIGN PATENT DOCUMENTS

| | | | | |
|---|---|---|---|---|
| JP | 2005099181 A | * | 4/2005 | |
| JP | 2006-022212 A | | 1/2006 | |
| JP | 2006056015 A | * | 3/2006 | ........ C09J 5/02 |
| JP | 2006-299277 A | | 11/2006 | |
| JP | 2010-064291 A | | 3/2010 | |
| JP | 2010-90327 | | 4/2010 | |
| JP | 2011-057986 A | | 3/2011 | |
| JP | 2011057986 A | * | 3/2011 | |
| JP | 2014118536 A | * | 6/2014 | |
| JP | 2017008166 A | * | 1/2017 | |
| WO | 2012/137724 | | 10/2012 | |
| WO | 2015/159818 A | | 10/2015 | |

OTHER PUBLICATIONS

IPRP issued in WIPO Patent Application No. PCT/JP2018/043254, dated May 26, 2020, English translation.

* cited by examiner

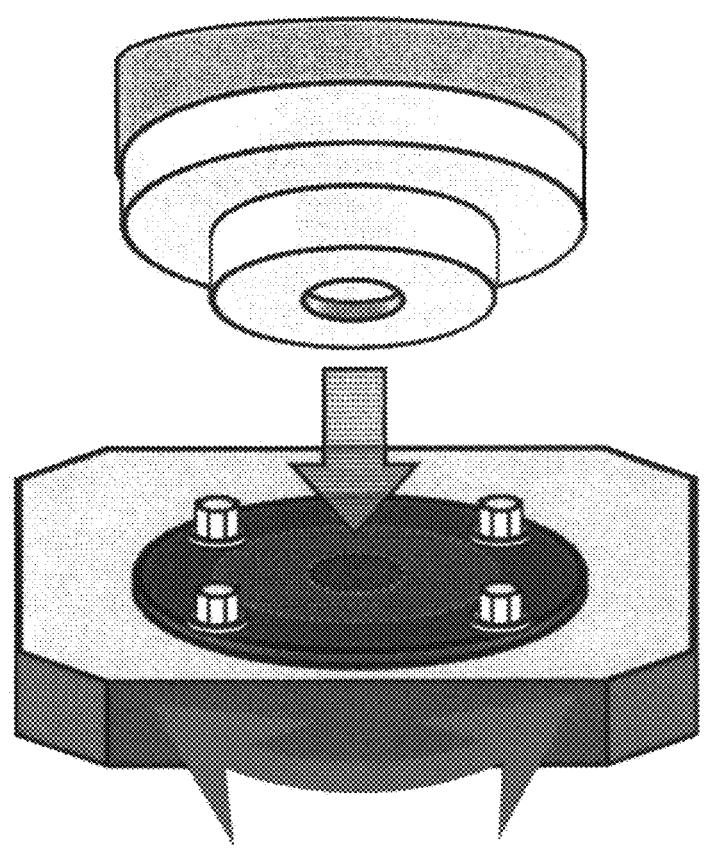

GASKET MATERIAL

TECHNICAL FIELD

The present disclosure relates to a gasket material. More particularly, the present invention relates to a gasket material that is effectively used as a cylinder head gasket etc.

BACKGROUND ART

Cylinder head gaskets are members that seal between engine heads and blocks. Cylinder head gaskets have a problem that the rubber layer is worn by vibration of the engine.

The abrasion resistance can be improved by increasing the compounded amount of a reinforcing filler; however, in this case, the rubber hardness increases, and the sealing properties deteriorate. In order to ensure the sealing properties, it is desirable for the material to have a micro-hardness of 5 to 25, preferably 10 to 20. In order to ensure such a micro-hardness, it is necessary for the rubber sheet to have a D hardness of 45 to 65, preferably 50 to 60.

PRIOR ART DOCUMENT

Patent Document

Patent Document 1: JP-A-2010-90327
Patent Document 2: WO 2012/137724 A1

OUTLINE OF THE INVENTION

Problem to be Solved by the Invention

The drawing FIGURE is a perspective view of a test machine used in a friction and abrasion test at the measuring time.

Means for Solving the Problem

The above object of the present disclosure can be achieved by a gasket material comprising a crosslinked fluororubber layer having a micro-hardness of 5 to 25 formed on a metal plate using a fluororubber composition comprising 30 to 70 parts by weight of carbon black having a CTAB specific surface area of 3 to 34 $m^2/g$, and 5 to 15 parts by weight of hydrated amorphous silicon dioxide having a BET specific surface area of 35 to 220 $m^2/g$, based on 100 parts by weight of fluororubber, wherein the total amount of carbon black and hydrated amorphous silicon dioxide is 80 parts by weight or less.

Effect of the Invention

In the present disclosure, a crosslinked fluororubber layer having a micro-hardness of 5 to 25, preferably 10 to 20, and a D hardness of 45 to 65, preferably 50 to 60, can be obtained by forming, on a metal plate, a layer of a crosslinked fluororubber composition in which specific amounts of carbon black and hydrated amorphous silicon dioxide (silica), each of which has a specific surface area, are compounded with a specific amount of fluororubber. Such a rubber laminated metal plate is effectively used as a cylinder head gasket material.

Here, the micro-hardness means a hardness of thin film rubber laminated on a steel plate, and its value is actually measured using a commercially available micro-hardness meter.

BRIEF DESCRIPTION OF DRAWINGS

FIG. 1 is a perspective view of a test machine used in a friction and abrasion test at the measuring time.

EMBODIMENTS FOR CARRYING OUT THE INVENTION

Examples of the metal plate include stainless steel plates, mild steel plates, zinc galvanized steel plates, SPCC steel plates, copper plates, magnesium plates, aluminum plates, aluminum die casting plates, and the like. These are generally used in a degreased state, and, as required, the metal surface is roughened by shot blast, scotch brite, hairline, dull finish, or the like. Moreover, for use in gasket materials, the plate thickness is generally about 0.1 to 1 mm.

The fluororubber forming the fluororubber composition includes, for example, homopolymers of vinylidene fluoride, hexafluoropropene, pentafluoropropene, trifluoroethylene, trifluorochloroethylene, tetrafluoroethylene, vinyl fluoride, perfluoroacrylic acid ester, perfluoroalkyl acrylate, perfluoro (methyl vinyl ether), perfluoro(ethyl vinyl ether), perfluoro (propyl vinyl ether), etc.; their atlernating copolymers or their copolymers with propylene. Preferably, vinylidene fluoride-hexafluoropropene copolymer, vinylidene fluoride-hexafluoropropene-tetrafluoroethylene terpolymer, tetrafluoroethylene-propylene copolymer, etc. are used. Practically, commercially available polyol-vulcanizable fluororubber can be generally used as it is.

Carbon black having a CTAB specific surface area of 3 to 34 $m^2/g$ is used at a ratio of 30 to 70 parts by weight based on 100 parts by weight of fluororubber. As the carbon black, commercially available products, such as Thermax N990 (produced by Cancarb) and HTC #S (produced by Shinnikka Carbon), can be used as they are.

If carbon black having a specific surface area of larger than this range is used, the reinforcing properties are so strong as to increase the hardness; accordingly, the kneading properties deteriorate, and the abrasion resistance also decreases. If the compounding ratio is less than this range, the abrasion resistance decreases.

As the silica, which is hydrated amorphous silicon dioxide, one having a BET specific surface area of 35 to 220 $m^2/g$ is used at a ratio of 5 to 15 parts by weight based on 100 parts by weight of fluororubber.

As the silica having such a BET specific surface area, synthetic amorphous silica, such as dry silica or wet silica, preferably dry silica, is generally used. In practice, commercially available products, such as products of Tosoh Silica Corporation having a predetermined specific surface area, are used.

If silica having a specific surface area of larger than this range is used, the reinforcing properties are so strong as to increase the hardness; accordingly, the kneading properties deteriorate, and the abrasion resistance also decreases. In contrast, if silica having a specific surface area of less than this range is used, the abrasion resistance is insufficient due to low hardness. If the compounding ratio is less than this range, the abrasion resistance decreases.

Further, if the total amount of carbon black and silica exceeds 80 parts by weight, the micro-hardness and D hardness do not show desired values, or the abrasion resistance is impaired. The upper limit of the compounding ratio of carbon black or silica is set in consideration of the total amount of both components.

The fluororubber composition comprising the above components as essential components is polyol-vulcanized. The polyol-based vulcanizing agent includes, for example, 2,2-bis(4-hydroxyphenyl)propane [bisphenol A], 2,2-bis(4-hydroxyphenyl)perfluoropropane [bisphenol AF], bis(4-hydroxyphenyl)sulfone [bisphenol S], 2,2-bis(4-hydroxyphenyl)methane [bisphenol F], bisphenol A-bis(diphenylphosphate), 4,4'-dihydroxydiphenyl, 2,2-bis(4-hydroxyphenyl)butane, etc. Preferably, bisphenol A, bisphenol AF, etc. are used. They can be in the form of alkali metal salts or alkaline earth metal salts. The polyol-based vulcanizing agent can be used generally at a ratio of about 0.5 to 10 parts by weight, preferably about 2 to 8 parts by weight, based on 100 parts by weight of polyol-vulcanizable fluororubber. The polyol-based vulcanizing agent can be also used as a master batch with fluororubber.

The vulcanization accelerator, which is used in combination with a vulcanization agent, includes quaternary onium salts such as quaternary phosphonium salts or quaternary ammonium salts. Preferably, quaternary phosphonium salts are used. The onium salt can be used at a ratio of about 0.5 to 6 parts by weight, preferably about 1 to 4 parts by weight, based on 100 parts by weight of polyol-vulcanizable fluororubber. The vulcanization accelerator can be also used as a master batch with fluororubber.

The quaternary phosphonium salts are compounds represented by the following general formula:

$$[PR_1R_2R_3R_4]^+X^-$$

(where $R_1$ to $R_4$ are alkyl groups having 1-25 carbon atoms, alkoxyl groups, aryl groups, alkylaryl groups, aralkyl groups or polyoxyalkylene groups, two or three of which can form a heterocyclic structure together with P, and X is an anion such as $Cl^-$, $Br^-$, $I^-$, $HSO_4^-$, $H_2PO_4^-$, $RCOO^-$, $ROSO_2^-$, $CO_3^{2-}$) and include, for example, tetraphenylphosphonium chloride, benzyltriphenylphosphonium bromide, benzyltriphenylphosphonium chloride, triphenylmethoxymethylphosphonium chloride, triphenylmethylcarbonylmethylphosphonium chloride, triphenylethoxycarbonylmethylphosphonium chloride, trioctylbenzylphosphonium chloride, trioctylmethylphosphonium chloride, trioctylethylphosphonium acetate, tetraoctylphosphonium chloride, trioctylethylphosphonium dimethylphosphate, etc. The quaternary phosphonium salts can be equimolar molecular compounds with active hydrogen-containing aromatic compounds such as polyhydroxyaromatic compound.

Furthermore, the quaternary ammonium compounds are compounds represented by the following general formula:

$$[NR_1R_2R_3R_4]^+X^-$$

(where $R_1$ to $R_4$ and $X^-$ have the same meanings as defined above) and include, for example, 1-alkylpyridinium salts, 5-aralkyl-1,5-diazabicyclo[4.3.0]-5-nonenium salts, 8-aralkyl-1,8-diazabicyclo[5.4.0]-7-undecenium salts, etc.

The fluororubber composition is also crosslinked with an organic peroxide or an amine compound.

A peroxide crosslinkable group, which is at least one of a bromine-containing group, an iodine-containing group, and a bromine/iodine-containing group, or an amine vulcanizable group comprising a cyano group and the like, may be introduced into the fluorine-containing rubber. Examples of the peroxide crosslinkable group or amine vulcanizable group include the following saturated or unsaturated bromine-containing compounds, iodine-containing compounds, bromine- and iodine-containing compounds, and cyano group-containing compounds.

$CF_2$=$CFBr$
$CF_2$=$CFI$
$CF_2$=$CHBr$
$CF_2$=$CHI$
$CH_2$=$CHCF_2CF_2Br$
$CH_2$=$CHCF_2CF_2I$
$CF_2$=$CFOCF_2CF_2Br$
$CF_2$=$CFOCF_2CF_2I$
$CH_2$=$CHBr$
$CH_2$=$CHI$
$Br(CF_2)_4Br$
$I(CF_2)_4I$
$Br(CH_2)_2(CF_2)_4(CH_2)_2Br$
$I(CH_2)_2(CF_2)_4(CH_2)_2I$
$ICF_2CF_2Br$
$CF_2$=$CFO(CF_2)_nOCF(CF_3)CN$
$CF_2$=$CFO(CF_2)_nCN$
$CF_2$=$CFO[CF_2CF(CF_3)O]_m(CF_2)_nCN$

The fluorine-containing rubber that copolymerizes a fluorine-containing diene compound and that has a peroxide crosslinkable group is crosslinked by an organic peroxide. Examples of the organic peroxide used as a crosslinking agent include t-butyl hydroperoxide, 1,1,3,3-tetramethylbutyl hydroperoxide, p-menthane hydroperoxide, cumene hydroperoxide, diisopropylbenzene hydroperoxide, 2,5-dimethylhexane-2,5-dihydroperoxide, di-t-butyl peroxide, dicumyl peroxide, t-butylcumyl peroxide, 1,1-di(t-butylperoxy)cyclododecane, 2,2-di(t-butylperoxy)octane, 1,1-di(t-butylperoxy)cyclohexane, 2,5-dimethyl-2,5-di(t-butylperoxy)hexane, 2,5-dimethyl-2,5-di(t-butylperoxy)hexyne-3, 1,3-bis(t-butylperoxyisopropyl)benzene, 2,5-dimethyl-2,5-di(benzoylperoxy)hexane, 1,1-di (t-butyperoxy)-3,3,5-trimethylcyclohexane, n-butyl-4,4-di(t-butylperoxy)valerate, benzoyl peroxide, m-toluyl peroxide, p-chlorobenzoyl peroxide, 2,4-dichlorobenzoyl peroxide, t-butylperoxy isobutyrate, t-butylperoxy-2-ethylhexanoate, t-butylperoxy benzoate, t-butylperoxyisopropyl carbonate, t-butylperoxyallyl carbonate, and the like. The organic peroxide is used at a ratio of about 0.5 to 10 parts by weight, preferably about 1 to 5 parts by weight, based on 100 parts by weight of the fluororubber.

When peroxide crosslinking is carried out, a polyfunctional unsaturated compound co-crosslinking agent such as diallyl phthalate, triallyl cyanurate, triallyl isocyanurate, trimethacryl isocyanurate, triallyl trimellitate, trimethylolpropane trimethacrylate, ethylene glycol dimethacrylate is preferably used at a ratio of about 0.5 to 6 parts by weight, preferably about 1 to 4 parts by weight, based on 100 parts by weight of fluororubber.

Furthermore, the fluororubber that copolymerizes a fluorine-containing diene compound and that has an amine-vulcanizable group is vulcanized by an amine compound. The amine compound used as a vulcanizing agent is the amine compounds represented by the following general formulas [I] to [IV]. The amine compound is used at a ratio of 0.1 to 10 parts by weight, preferably 0.5 to 5 parts by weight, based on 100 parts by weight of fluororubber.

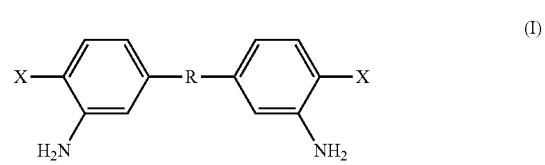

(I)

R: an alkylidene or alkylene group having 1 to 6 carbon atoms, a perfluoroalkylidene or perfluoroalkylene group having 1 to 10 carbon atoms, $SO_2$ group, O group, CO group, or a carbon-carbon bond directly linking two benzene rings X: a hydroxyl group or an amino group

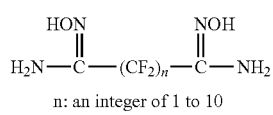

n: an integer of 1 to 10

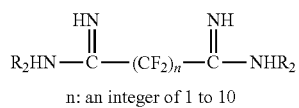

n: an integer of 1 to 10

Preferably,

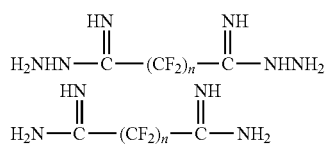

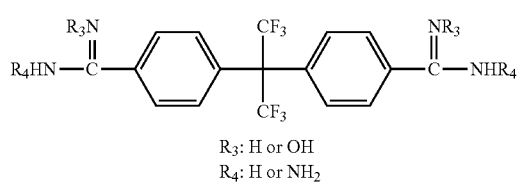

$R_3$: H or OH
$R_4$: H or $NH_2$

Preferably,

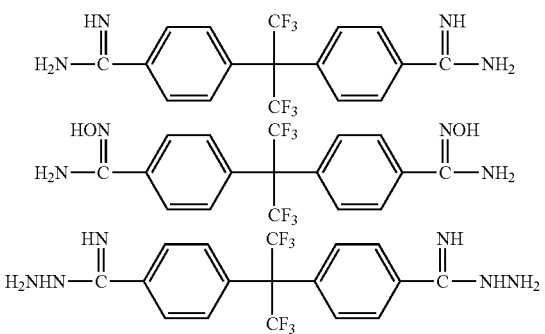

The composition is prepared by suitably compounding, in addition to the above components, metal compound acid acceptors used in general rubber compounding, and further other rubber compounding agents, such as hydrotalcite acid acceptors, and processing aids (e.g., carnauba wax, sodium stearate), as necessary, followed by kneading using a closed type kneading machine (e.g. an intermix, a kneader, or a Banbury mixer) or an open roll. Thereafter, vulcanization molding is performed to form a crosslinked fluororubber layer having a micro-hardness of 5 to 25, preferably 10 to 20, and a D hardness of 45 to 65, preferably 50 to 60, on a metal plate.

Generally, a rubber laminated metal plate is produced by sequentially forming a cover coat layer, which is an adhesive layer, and a fluororubber layer, on a metal plate on which a lower primer layer is formed.

The lower primer layer is expected to significantly improve the heat resistance and water resistance of the rubber metal laminate for rubber bonding. It is desirable to form the lower primer layer particularly when the rubber metal laminate is used as a gasket material.

The lower primer layer includes, for example, inorganic films such as, zinc phosphate films, iron phosphate films, coating-type chromate films, compounds of metals such as vanadium, zirconium, titanium, aluminum, silicone, molybdenum, tungsten, manganese, zinc, cerium, etc., particularly oxides of these metals, and organic films such as silanes, phenol resin, epoxy resin, polyurethane, etc. Generally, commercially available chemical solutions or publicly known art can be used as they are. Preferably, a primer layer containing an organometallic compound having at least one or more of chelate ring and alkoxy group, a primer layer further containing a metal oxide or silica in addition to the organometallic compound, and more preferably, a primer layer further containing a hydrolysis condensation product of an amino group-containing alkoxy silane and a vinyl group-containing alkoxysilane in addition to the afore-mentioned primer layer-forming components can be used. The hydrolysis condensation product can be used also alone.

The organometallic compound includes, for example, organoaluminum compounds such as ethylacetoacetate aluminum diisopropylate, aluminum tris(ethyl acetoacetate), aluminum-mono-acetylacetonate-bis(ethyl acetoacetate), aluminum tris(acetylacetate); organotitanium compounds such as isopropoxytitanium bis(ethyl acetoacetate), 1,3-propanedioxytitanium bis(ethyl acetoacetate), diisopropoxytitanium bis(acetylacetonate), titanium tetra(acetylacetonate); organozirconium compounds such as di-n-butoxyzirconium bis(acetylacetonate), di-n-butoxyzirconium bis(ethyl acetoacetate), and preferably organotitanium compounds composed of chelate ring(s) and alkoxy group(s), represented by the following general formulae:

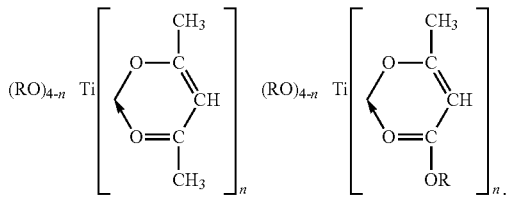

where R: a lower alkyl group such as $CH_3$, $C_2H_5$, n-$C_3H_7$, i-$C_3H_7$, n-$C_4H_9$, i-$C_4H_9$
n: an integer of 1 to 4

As the adhesive for forming a cover coat layer, a resin-based adhesive containing epoxy resin, phenol resin, and tertiary amine compound is used. As epoxy resin, for example, phenol novolac type epoxy resin, o-cresol novolac type epoxy resin, or the like is used. Further, as phenol resin, novolac type phenol resin obtained by condensation polymerization of a phenol compound such as phenol, cresol or alkylphenol, with formaldehyde is generally used. As the tertiary amine compound, which acts as a curing agent for these components, for example, 2,4,6-tris(dimethylaminomethyl)phenol, 2-methylimidazole, 2-ethyl-4-methylimidazole, or the like is used. As the vulcanization adhesive for fluororubber, for example, commercially available Sixon 300/311 (produced by Rohm and Haas) can be also used as it is.

Such a vulcanization adhesive is generally prepared as a solution having a component concentration of about 0.1 to 10 wt. % using an alcohol based organic solvent, such as methanol, ethanol, or isopropanol, or a ketone-based organic solvent, such as acetone, methyl ethyl ketone, or methyl isobutyl ketone, alone or as a mixed solvent. The resulting solution is applied onto a metal plate on which a lower primer layer is formed, followed by drying and baking under drying and baking conditions suitable for the adhesive used.

The adhesive layer may have a multilayer structure as well as a single-layer structure. For example, adhesives are applied in multiple stages by forming an epoxy resin-based adhesive layer containing an organometallic compound on the lower primer layer, and further providing an epoxy resin-based adhesive layer thereon, after which a fluororubber layer is formed thereon. Although such a structure increases the number of steps of applying adhesive layers, it is possible to further increase the adhesion between the cover coat layer and the fluororubber layer.

On the adhesive layer, a rubber paste coating liquid obtained by dissolving the fluororubber composition in an organic solvent, such as a ketone-based one (e.g., methyl ethyl ketone or methyl isobutyl ketone) or an ester-based one (e.g., ethyl acetate or butyl acetate), is applied to form a thickness of about 10 to 200 μm, followed by crosslinking at about 160 to 250° C. for about 0.5 to 30 minutes. In the obtained rubber metal laminate, a coating agent such as resin-based one or graphite-based one can be coated on the rubber layer, for the purpose of preventing the adhesion of rubber.

EXAMPLES

The following describes the present disclosure with reference to Examples.

Example

A Ti/Al-based primer was applied onto a degreased stainless steel plate (thickness: 0.2 mm), and baked at 200° C. for 10 minutes to form a lower primer layer. An adhesive comprising a cresol novolac type epoxy resin as a main component was applied there onto and baked at 200° C. for 5 minutes to form a cover coat layer.

A rubber paste coating liquid obtained by dissolving a fluororubber composition having the following formulation in methyl isobutyl ketone was applied onto the cover coat layer so that the coating thickness after drying was about 100 to 200 μm, followed by crosslinking at 190° C. for 10 minutes, thereby forming a rubber layer.

Further, a coating liquid in which wax and graphite were dispersed was applied onto the rubber layer, and baked at 200° C. for 5 minutes to form an anti-adhesion layer, thereby producing a gasket material.

The prepared fluororubber compositions and the produced gasket materials were measured or evaluated for the following items.

D hardness measurement: The D hardness was measured with a Type D durometer according to JIS K6253-3 using a rubber sheet, prepared by laminating three sheets of the test pieces (50×50×2 mm) obtained by crosslinking and molding the fluororubber composition at 170° C. for 20 minutes. The D hardness is preferably 50 to 65.

Micro-hardness measurement: The micro-hardness was measured by performing a push-in test under the conditions of load speed: 5.5 mN/sec and a measurement depth: 5 μm, using a dynamic ultramicro-hardness meter DUH-211S (produced by Shimadzu Corporation). The micro-hardness is preferably 10 to 20.

Friction and abrasion test: Using the test machine shown in the drawing FIGURE (jig size: an outer diameter of 40 mm and an inner diameter of 30 mm), samples that were pre-treated at 220° C. for 7 hours were rotationally and reciprocally moved while pressing the circular jig against the samples under the following conditions: surface pressure: 100 to 150 MPa, twist angle: 0.1 to 1°, frequency: 2 to 20 Hz, test temperature: 220° C., number of times: 80,000 times. When the steel plate was not exposed, this case was evaluated as o, and when the steel plate was exposed, this case was evaluated as x.

The following table shows the obtained results. Note that Nos. in the parentheses represent Comparative Examples.

TABLE

| No. | Carbon black | | | Silica | | | D hardness | Micro-hardness | Abrasion resistance |
| --- | --- | --- | --- | --- | --- | --- | --- | --- | --- |
| | A | B | C | A | B | C | | | |
| (1) | | | 30 | | 5 | | 65< | 20< | X |
| 2 | | 30 | | | 5 | | 56 | 10 | ○ |
| 3 | 30 | | | | 5 | | 48 | 8 | ○ |

| | |
| --- | --- |
| Fluororubber (DAI-EL G7400BP, produced by Daikin Industries, Ltd.) | 100 parts by weight |
| CB-A (Thermax N990, produced by Cancarb, Limited CTAB specific surface area: 3 to 9 m$^2$/g) | |
| CB-B (HTC#S, produced by Shinnikka Carbon, Co., Ltd. CTAB specific surface area: 20 to 34 m$^2$/g) | |
| CB-C (HTC#100, produced by Shinnikka Carbon, Co., Ltd. CTAB specific surface area: 40 to 55 m$^2$/g) | |
| Silica-A (NIPSIL E74P, produced by Tosoh Silica Corporation, BET specific surface area: 35 to 55 m$^2$/g) | |
| Silica-B (NIPSIL LP, produced by Tosoh Silica Corporation, BET specific surface area: 180 to 220 m$^2$/g) | |
| Silica-C (NIPSIL KQ, produced by Tosoh Silica Corporation, BET specific surface area: 215 to 265 m$^2$/g) | Each predetermined amount |
| Calcium hydroxide (CALDIC 2000, produced by Ohmi Chemical Industry Co., Ltd.) | 2 parts by weight |
| Magnesium oxide (Kyowamag 150, produced by Kyowa Chemical Industry Co., Ltd.) | 5 parts by weight |
| Processing aid (TE-58A, produced by Technical Processing Inc) | 0.5 parts by weight |
| Polyol-based vulcanizing agent (Curative #30, produced by DuPont) | 8 parts by weight |
| Polyol-based vulcanization accelerator (Curative #20, produced by DuPont) | 4 parts by weight |

TABLE-continued

| No. | Carbon black A | B | C | Silica A | B | C | D hardness | Micro-hardness | Abrasion resistance |
|---|---|---|---|---|---|---|---|---|---|
| (4) | | | 70 | 5 | | | 65< | 20< | X |
| 5 | 70 | | | 5 | | | 62 | 15 | ○ |
| (6) | | | 30 | 15 | | | 65< | 20< | X |
| 7 | | 30 | | 15 | | | 55 | 12 | ○ |
| 8 | 30 | | | 15 | | | 58 | 14 | ○ |
| (9) | | | 70 | 15 | | | 65< | 20< | X |
| (10) | | 70 | | 15 | | | 69 | 26 | ○ |
| (11) | | 30 | | | 5 | | 62 | 19 | X |
| 12 | | 30 | | | 5 | | 56 | 12 | ○ |
| 13 | | 30 | | 5 | | | 52 | 11 | ○ |
| (14) | | 70 | | | 15 | | 65< | 20< | X |
| (15) | 30 | | | | 5 | | 59 | 15 | X |
| 16 | 30 | | | | 5 | | 55 | 12 | ○ |
| 17 | 30 | | | 5 | | | 51 | 11 | ○ |
| (18) | 30 | | | | 15 | | 65< | 20< | X |
| 19 | 30 | | | | 15 | | 60 | 16 | ○ |
| 20 | 30 | | | | | 15 | 55 | 12 | ○ |
| 21 | 25 | 25 | | | 5 | | 61 | 19 | ○ |
| 22 | 50 | | | | 15 | | 59 | 15 | ○ |
| (23) | | | 20 | | 15 | | 52 | 12 | X |
| (24) | | | 25 | | 15 | | 55 | 13 | X |
| (25) | 20 | | | | | | 48 | 8 | X |
| (26) | 20 | | | | 10 | | 53 | 14 | X |

The results of each of the above Examples and Comparative Examples demonstrate the following.

(1) Regarding the specific surface area of carbon black used, those having a specific surface area of more than 34 m²/g have too strong reinforcing properties and thus have a high hardness; accordingly, the kneading properties deteriorate. In contrast, those having a specific surface area of less than 3 m²/g are not available in commercial products.

(2) Regarding the specific surface area of silica used, those having a specific surface area of more than 220 m²/g have too strong reinforcing properties and thus have a high hardness; accordingly, the kneading properties deteriorate.

(3) If the total amount of carbon black and silica exceeds 80 parts by weight, the micro-hardness and D hardness do not show desired values, or the abrasion resistance is impaired.

(4) Each of the Examples shows a micro-hardness of 5 to 25, and is also excellent in terms of D hardness and abrasion resistance.

The invention claimed is:

1. A cylinder head gasket material comprising
a crosslinked fluororubber layer having a micro-hardness of 5 to 25 formed on a metal plate using a fluororubber composition comprising
30 to 70 parts by weight of carbon black having a CTAB specific surface area of 3 to 34 m²/g, and
5 to 15 parts by weight of hydrated amorphous silicon dioxide having a BET specific surface area of 35 to 220 m²/g, based on 100 parts by weight of fluororubber,
wherein the total amount of carbon black and hydrated amorphous silicon dioxide is 80 parts by weight or less; and
wherein the crosslinked fluororubber layer having a D hardness of 50 to 60 is formed.

2. The cylinder head gasket material according to claim 1, wherein the crosslinked fluororubber layer is formed using a polyol vulcanizing agent and a quaternary onium salt vulcanization accelerator.

3. The cylinder head gasket material according to claim 1, wherein the micro-hardness is 10 to 20.

\* \* \* \* \*